United States Patent
Russo

Patent Number: 5,500,234
Date of Patent: Mar. 19, 1996

[54] CRISPY CHIP SANDWICH AND PROCESS OF PRODUCING A SANDWICH PRODUCT

[76] Inventor: Peter J. Russo, 150 Rockland Rd., Guildford, Conn. 06437

[21] Appl. No.: 318,084

[22] Filed: Oct. 5, 1994

[51] Int. Cl.⁶ ..................................................... A23G 3/00
[52] U.S. Cl. .............. 426/103; 426/89; 426/93; 426/94; 426/102; 426/293; 426/306
[58] Field of Search ................... 426/89, 93, 94, 426/102, 103, 293, 306

[56] References Cited

U.S. PATENT DOCUMENTS

| | | |
|---|---|---|
| 3,620,769 | 11/1971 | Peterson ................................. 426/93 |
| 4,421,771 | 12/1983 | Stock et al. ............................. 426/94 |
| 4,661,360 | 4/1987 | Smith ..................................... 426/94 |

*Primary Examiner*—Helen Pratt
*Attorney, Agent, or Firm*—Lawrence Hager

[57] ABSTRACT

A food product comprising a multilayer cookie or snack having outer layers formed from a crispy type edible food product such as a potato chip or corn chip, etc. with an intermediate marshmallow layer being in contact with the inner surface of each crispy chip and one or more filler substances such as chocolate, peanut butter spread, etc. disposed between the two marshmallow layers. The marshmallow layers act to bond the snack food item together while insulating the crispy chip from contact with the filler layers to substantially prevent said crispy chips from becoming soggy and non-crispy.

1 Claim, 2 Drawing Sheets

CRISPY CHIP SANDWICH AND PROCESS OF PRODUCING A SANDWICH PRODUCT

FIELD OF THE INVENTION

The present invention relates to food products and so-called snack foods and, more particularly, to a crispy multilayered cookie or sandwich like product wherein intermediate filler material may be used between the outer crispy chip or cookie layers without degradation of the crispiness of said outer layers.

BACKGROUND OF THE INVENTION

This invention relates to a generally fried crispy food product and snack type food. In the past several years, a plenteous variety of cookies and other type snack foods have been introduced in the market place.

In addition, various types of potato, corn, rice and oat chips, etc. have been formulated and prepared by, for example, deep frying to obtain a crispy texture.

For example, the preparation of dough from which potato chips can be made has been previously disclosed by Markakis et al in U.S. Pat. No. 3,027,258; by Hilton in U.S. Pat. No. 3,109,739; by Schaul in U.S. Pat. No. 2,469,995, by Succo et al in U.S. Pat. No. 3,493,390, by Koshida et al in U.S. Pat. No. 4,279,932 and by d'Arnaud et al in U.S. Pat. No. 3,220,852.

It is noted that such crispy products, in particular potato chips, are not used to form a sandwich snack with any intermediate filler containing oils, and/or moisture such as chocolate, peanut butter spreads, coconut, etc. because the crispy potato chip hitherto would quickly absorb the oils and/or moisture and become soggy.

Although many people do enjoy dipping crispy potato chips, corn chips and the like into peanut butter and/or chocolate etc., such food product combinations have not been provided in pre-packaged form because hitherto the crispy chips are known to become soggy within minutes after such dipping.

In total contrast to the prior art, the present invention provides both a method of substantially preventing a crispy chip such as potato chip from becoming soggy when used in a cookie or sandwich like arrangement including a filler food such as peanut butter and/or chocolate and/or jelly etc. In addition, the present invention provides a new and improved food product which includes in combination: a pair of spaced apart crispy chips with their respective opposing aligned surfaces being coated with a food item generally referred to as marshmallow which is heated and spread on said surfaces with one or more intermediate layers of food items such as chocolate and/or peanut butter and/or jelly etc. The sandwich like arrangement is pressed together whereby the marshmallow coating forms an adhesive like layer between the crispy chips and the intermediate filler food. It has been discovered that the marshmallow layer/coating does not degrade the crispy texture of the chips and provides an insulating coating between the crispy chips and the filler foods. In this manner the moisture and/or oils etc. contained within the filler layers do not contaminate the chips.

SUMMARY OF THE INVENTION

A multilayered food product, in combination, comprising:

two or more spaced apart and aligned crispy chips (11);

a layer coating of marshmallow (12) applied over at least each aligned opposite facing side of each said crispy chip and bonded thereon;

an intermediate layer of food (13) selected from the group consisting of substances generally known as peanut butter, chocolate, coconut, jelly, jams, candy, marmalades, syrups, fruits and extracts disposed between and bonded to said marshmallow layers to form a substantially united food product of discrete food layers.

A multilayered food product, in combination, comprising:

at least three spaced apart and aligned crispy chips (11);

a layer coating of marshmallow (12) applied over at least each aligned opposite facing side of each said crispy chip and bonded thereon whereby the outermost chips are coated on at least one of its sides and the interposed chips being coated with said marshmallow on both its sides; and at least two intermediate filler layers of food (13) selected from the group consisting of substances generally known as peanut butter, chocolate, coconut, jelly, jams, candy, marmalades, syrups, fruits and extracts, with each selected filler layer being disposed between and bonded to a respective pair of opposite facing said marshmallow layers to form a substantially united food product of discrete food layers.

A process of producing an improved multilayered crispy chip type sandwich food product suitable for being packaged and shipped to retail stores substantially without degradation of the crispyness of the chips, consisting of the steps of:

selecting two or more crispy chips from the group consisting of potato chips, corn chips, rice cakes, oat crackers and wheat crackers;

coating at least one side of each said crispy chip with a marshmallow like food product;

aligning said crispy chips in spaced opposite facing disposition of respective sides; and inserting an intermediate filler food product selected from the group consisting of substances generally known as peanut butter, chocolate, coconut, jelly, jams, candy, marmalades, syrups, fruits and extracts, with each selected filler layer being disposed between and bonded to a respective pair of opposite facing said marshmallow like layers to form a substantially united food product of discrete food layers.

OBJECTIVES OF TEE INVENTION

It is an object of the present invention to provide a new and improved so-called snack food.

It is another object of the present invention to provide a new and improved potato chip sandwich type food product.

It is another object of the present invention to provide a new and improved crispy chip with filler type cookie.

It is another object of the present invention to provide a potato chip laminate food product containing one or more potato chips coated in part or in whole with a marshmallow like food product.

It is another object of the present invention to provide a pair of spaced apart aligned crispy potato chips each being coated, in part of in whole, with a so-called marshmallow food product and having an intermediate filler food such as chocolate and/or peanut butter and/or jelly-jam and/or candy and/or coconut etc secured to said marshmallow coatings.

It is another object of the present invention to provide a crispy chip and filler snack type food which is relatively less likely to become soggy with packaging and storing on shelves.

BRIEF DESCRIPTION OF THE DRAWINGS

Other objects and advantages of the invention will be evident from the following detailed description; with like reference numbers referring to like items throughout.

DESCRIPTION OF THE PREFERRED EMBODIMENTS

Figure 1:
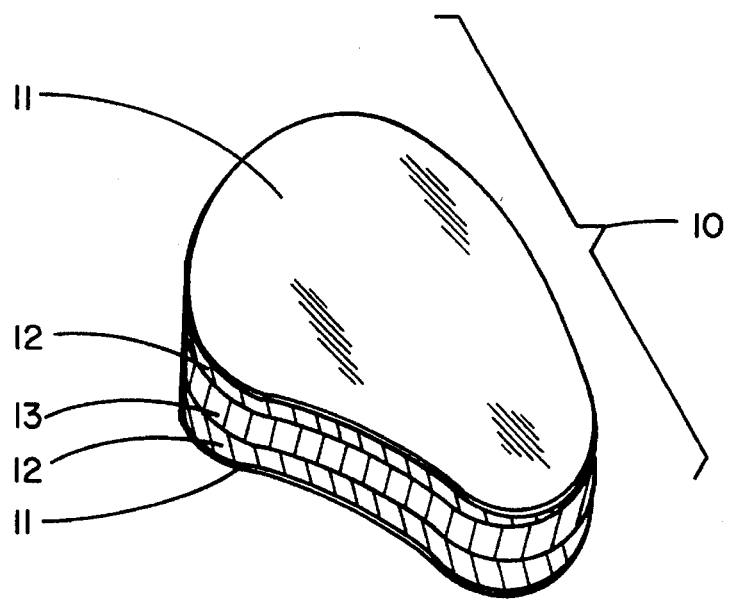
FIG. 1 is a perspective view of a snack food formulated in accordance with the invention.
Figure 2:
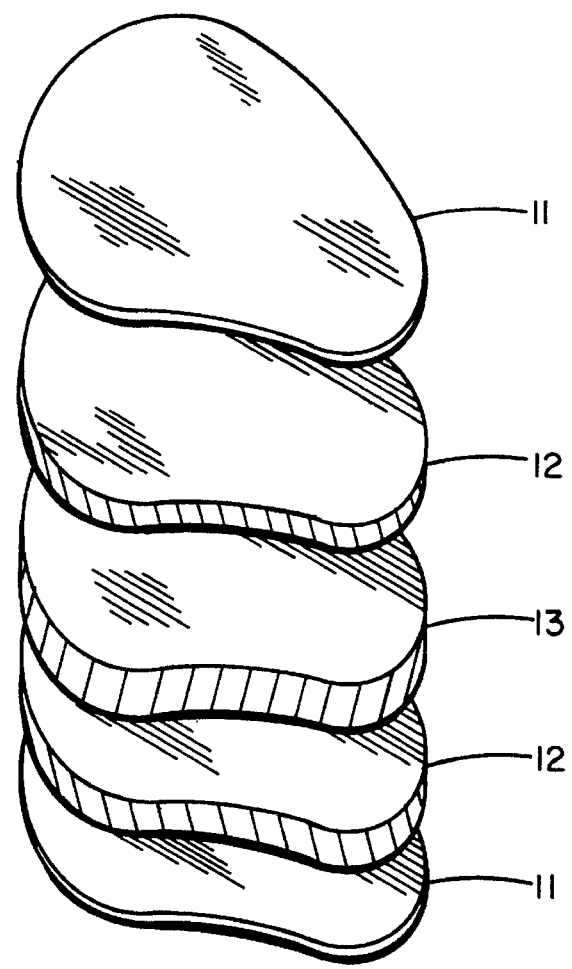
FIG. 2 is an exploded view of the snack food item shown in FIG. 1.

With reference now to FIGS. 1 and 2, a first preferred embodiment of the invention is illustrated. Generally speaking, the sandwich or cookie like snack type food item 10 comprises two or more crispy chips 11, one or more layers or coatings of marshmallow 12, and one or more layers of a filled food substance or member 13.

The crispy chips 11 may be of conventional ingredients and texture and are commercially available and known as potato chips or corn chips or made from rice, oats, wheat, etc. In the preferred embodiments illustrated in FIGS. 1–3, a potato chip 11 is depicted. The potato chip may be made from a dough which is rolled into a thin, substantially elliptical or round or oval wafer which is typically frozen to facilitate handling. The wafers are backed to provide a crisp, tasty potato chip 11. Alternatively, the wafers may be formed by frying slices of raw potatoes.

Next, a heated or prepared to a semi-sticky soft and pliable consistency layer of a food item 12 generally known as marshmallow is applied to at least one side 14 of each crispy chip 11. The marshmallow layer 12 is applied to a predetermined thickness to obtain a cohesion with each respective crispy chip 11 and a desired look and taste, which may be empirically determined.

A filler layer 13 consisting of, for example, chocolate and/or peanut butter and/or coconut and/or jelly or jams, is applied or layered onto the marshmallow layer 12. The marshmallow layer 12 preferably is maintained in a soft pliable state while the filler layer 13 is applied to facilitate a bonding therebetween.

Each crispy chip 11 with its respective food coatings or layers 12, 13 are aligned and joined by slight compression on the outer side 14 of each crispy chip 11 to form a unified cohesive sandwich or cookie like snack food item 10.

The marshmallow layers 12,16 serve several important features and advantages in accordance with the invention. Firstly, the marshmallow layer 12,16 provides an insulative function to prevent the moisture and/or oils etc. present in the filler layer 13,17 from contact with and contamination of the crispy chips 11,15 which otherwise would result in a degradation of their crispy characteristic. Secondly, it has been discovered that the marshmallow layer not only adheres to but also does not degrade the crispy characteristic texture of the chips 11. Thirdly, the marshmallow layers 12,16 function as an edible adhesive to bond the multiple food layers and chips 11,15 into a substantially unified food package adapted for being relatively easily hand held. Fourthly, the food package 10 is adapted for being containerized, for example, in a plastic wrapper, for placement in boxes and on shelves etc. Fifthly, the food package 10 enables the combination of numerous different flavor fillers 11 with marshmallow and crispy chips 11,15 in a prepared snack food package without causing sogginess of the chips 11,15.

Figure 3:
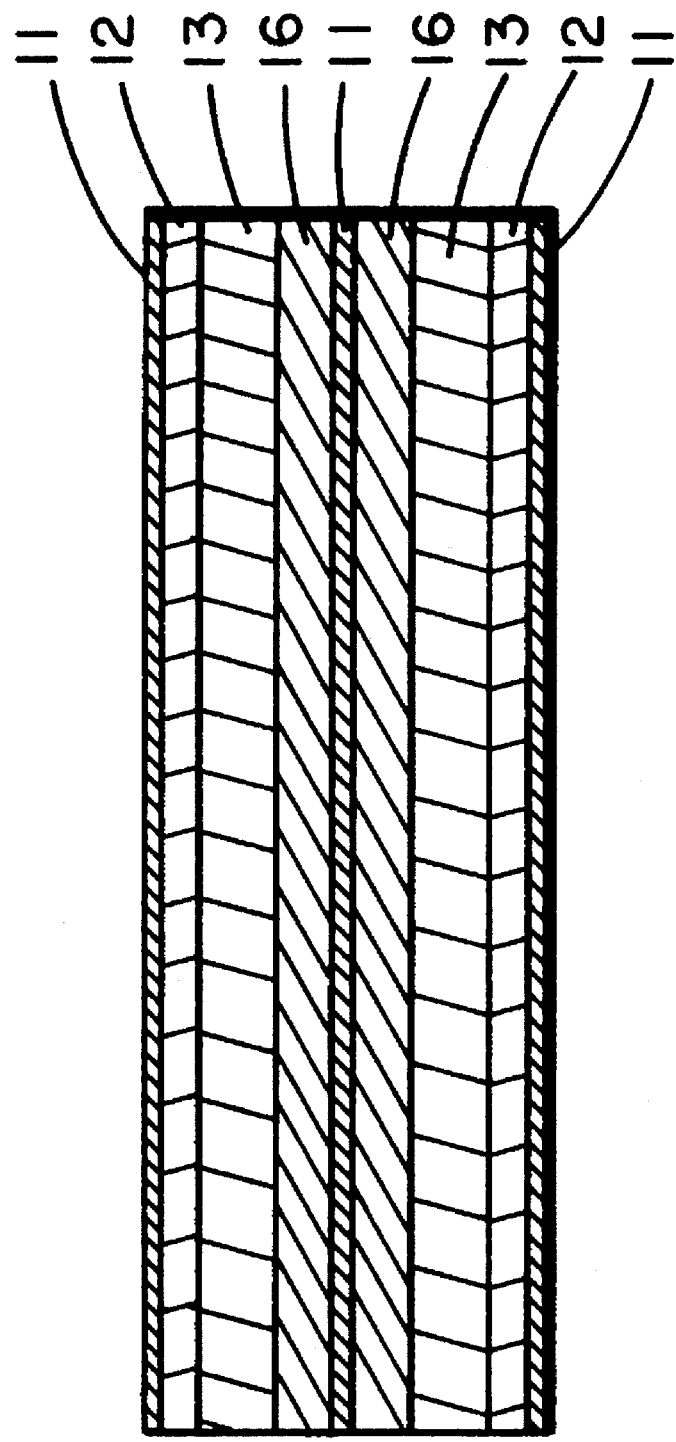
FIG. 3 is an end view of an alternative embodiment of a snack food item formulated in accordance with the invention.

With particular reference now to FIG. 3, an alternative embodiment of the invention is shown.

Generally speaking, this embodiment incorporates the features and advantages noted above with reference to FIGS. 1 and 2, while increasing the number of chips 11,15 marshmallow 12,16 and filler 13,17 layers.

For example, an intermediate crispy chip 15 being coated on each of its sides with a protective marshmallow layer 16 is aligned and unified with the outer two crispy chips 11 to form a so-called triple decker or club like sandwich or cookie. This arrangement enables increased variations of different filler layers 12 to be combined with the crispy chips.

While this invention has been described with reference to specific embodiments, it will be recognized by those skilled in the art that variations are possible without departing from the spirit and scope of the invention, and that it is intended to cover all changes and modifications of the invention disclosed herein for the purposes of illustration which do not constitute departure from the spirit and scope of the invention.

What is claimed is:

1. A process of producing an improved multilayered crispy chip type sandwich food product suitable for being packaged and shipped to detail stores substantially without degradation of the crispyness of the chips, consisting of the steps of:

selecting two or more crispy chips (11) from the group consisting of potato chips, corn chips, rice cakes, oat crackers and wheat crackers;

coating at least one side of each said crispy chip with a marshmallow like food product;

aligning said crispy chips in spaced apart disposition;

inserting an intermediate filler food product selected from the group consisting of substances generally known as peanut butter, chocolate, coconut, jelly, jams, candy, marmalades, syrups, fruits and extracts, with each selected filler layer being disposed between and bonded to a respective pair of opposite facing said marshmallow like layers to form a substantially united food product of discrete food layers.

\* \* \* \* \*